(12) United States Patent
Li

(10) Patent No.: US 7,311,453 B2
(45) Date of Patent: Dec. 25, 2007

(54) LENS TUBE AND MOUNTING BASE THEREOF

(75) Inventor: Min-Che Li, Taichung (TW)

(73) Assignee: Largan Precision Co., Ltd., His-Tun Dist., Taichung (TW)

( * ) Notice: Subject to any disclaimer, the term of this patent is extended or adjusted under 35 U.S.C. 154(b) by 171 days.

(21) Appl. No.: 11/305,320

(22) Filed: Dec. 19, 2005

(65) Prior Publication Data

US 2007/0139939 A1    Jun. 21, 2007

(51) Int. Cl.
*G03B 17/00* (2006.01)
*G02B 7/00* (2006.01)
*F21V 17/00* (2006.01)

(52) U.S. Cl. .................. 396/529; 359/827; 359/829; 362/455

(58) Field of Classification Search ............. 362/268, 362/455; 359/365, 819, 829–830; 396/346, 396/529, 533
See application file for complete search history.

(56) References Cited

U.S. PATENT DOCUMENTS

| | | | | |
|---|---|---|---|---|
| 6,469,844 B1* | 10/2002 | Iwase et al. | ................ | 359/819 |
| 6,476,985 B2* | 11/2002 | Dou et al. | ................ | 359/823 |
| 6,480,346 B2* | 11/2002 | Funakoshi | ................ | 359/808 |
| 6,898,030 B1* | 5/2005 | Lin et al. | ................ | 359/819 |

* cited by examiner

*Primary Examiner*—Ali Alavi
(74) *Attorney, Agent, or Firm*—Charles E. Baxley

(57) ABSTRACT

A lens tube and a mounting base thereof comprise a lens tube for reception of a lens array and a mounting base for accommodation of an image sensor. On an outer periphery of the lens tube is formed a first conical surface, and in the mounting base is formed a concave portion. A second conical surface is formed in the concave portion for mating with the first conical surface of the lens tube. The first conical surface of the lens tube and the second conical surface of the mounting base can cooperate with each other, so as to prevent dust contamination and to make the central axis aligned with the optical axis.

7 Claims, 3 Drawing Sheets

LENS TUBE AND MOUNTING BASE THEREOF

BACKGROUND OF THE INVENTION

1. Field of the Invention

The present invention relates to a lens tube and a mounting base thereof, wherein a first conical surface of the lens tube and a second conical surface of the mounting base cooperate with each other, so as to prevent dust contamination and to make the central axis aligned with the optical axis.

2. Description of the Prior Art

The existing lens tube 10 and the mounting base 11 thereof is shown in FIG. 1, in the lens tube 10 is formed a passage 12 in which being inserted a lens array 13, and the optical axis a of the lens array 13 is in alignment with the optical axis b of the passage 12. By such arrangements, the optical signal of the object to be shot will be focused on the image sensor 14 after passing through the lens array 13. In the passage 12 are formed a plurality of inner threads. In the mounting base 11 is defined a passage 12 and on the outer periphery of the passage 12 are formed a plurality of outer threads for mating with the inner threads of the lens tube 10. The abovementioned arrangements can prevent dust from falling on the image sensor 14 when the lens tube 10 is assembled on the mounting base 11, affecting the image quality, however, it still has the following defects that need to be improved:

First, the lens tube 10 and the mounting base 11 are screwed together in a single thread manner, so that the optical axes a and b are likely to deviate from each other if the inner and outer threads are not engaged appropriately, or due to the wobbles of the lens tube 10 with respect to the mounting base 11, and as a result, the optical signal will not be transmitted to the image sensor 14 precisely, causing fogging image or halation.

Second, sine the lens tube 10 and the mounting base 11 are screwed together in a single thread manner, clearance will occur at the engaging portion between the lens tube 10 and the mounting base 11 after long time of use. And the clearance will be increased once it occurs, the optical axis a will deviate from the optical axis b, so that the optical signal of the object to be shot cannot be projected as desired onto the image sensor 14.

The present invention has arisen to mitigate and/or obviate the afore-described disadvantages.

SUMMARY OF THE INVENTION

The primary objective of the present invention is to provide a lens tube and a mounting base thereof, wherein a first conical surface of the lens tube and a second conical surface of the mounting base can cooperate with each other to prevent dust contamination and to make the central axis aligned with the optical axis. The present invention comprises a lens tube, a mounting base, a lens array and an image sensor. The objectives of the present invention are described below:

Nowadays, people's demand on image resolution is becoming increasingly strict. The theory of formation of an image is that the optical signals of an object to be shot are focused by the lens array and then transmitted to the image sensor. During the process of image forming and in order to ensure an optimum image, the optical axis must be aligned with the central axis of the lens tube and the mounting base. Therefore, the present invention provides an improved lens tube and a mounting base, wherein the lens array is disposed in the lens tube, and then the lens tube is screwed to the mounting base, by such arrangements, the optical axis will be in alignment with the central axis.

One important characteristic of the present invention is that the lens tube has a first conical surface, the mounting base has a second conical surface, and the two conical surfaces are engaged with each other. The engagement of the first and second conical surfaces can enable the central axis of the lens tube and the mounting base to be positioned more stably. The central axis and the optical axis will not deviate even after long time of use, so that the optical signal of the object to be shot can be focused and transmitted precisely to the image sensor. In addition, it can alleviate the wobbles of the lens tube and the mounting base.

The more important characteristic of the present invention is that the locking portion of the lens tube is formed between an inner periphery and an outer periphery of the lens tube for mating with the locking portion of the mounting base, such arrangement can prevent dust contamination.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
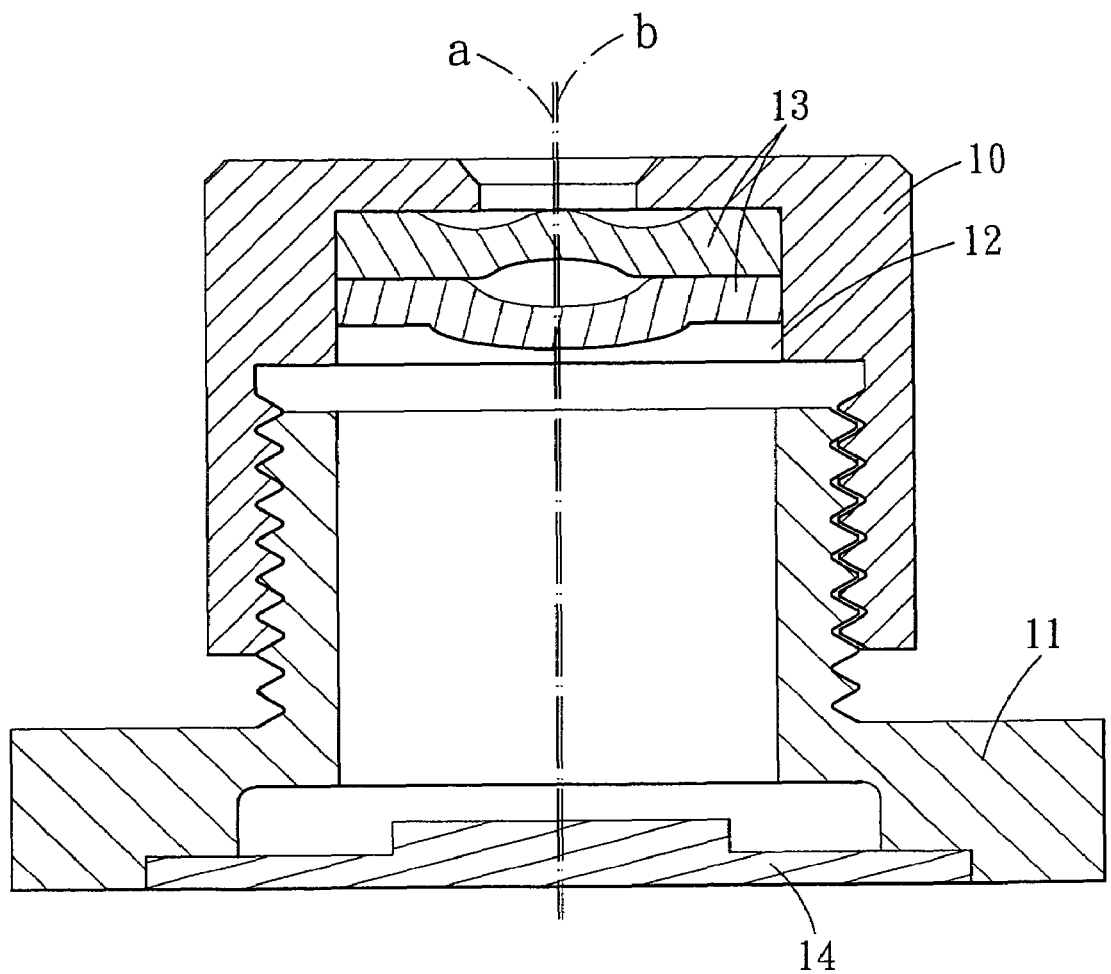
FIG. 1 is an operational view of showing a conventional lens tube and a mounting base thereof.
Figure 2:
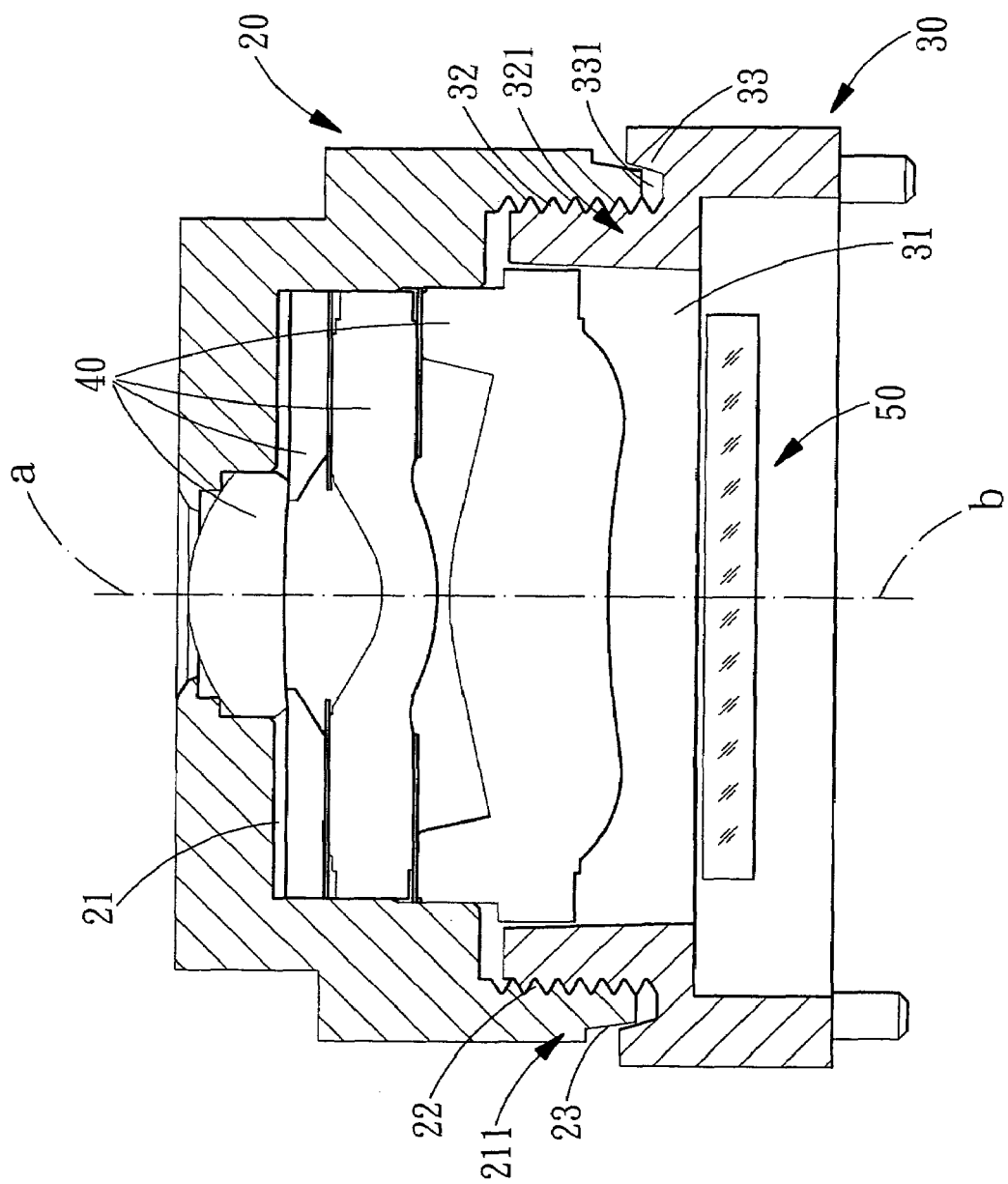
FIG. 2 is an operational view of showing a lens tube and a mounting base thereof in accordance with the present invention.

Referring to FIG. 2, a preferred embodiment of the present invention is shown and comprises a lens tube 20, a mounting base 30, a lens array 40 and an image sensor 50.

The lens tube 20 is a hollow cylindrical member having a receiving space 21, at the inner periphery of a flange 211 at the lower portion of the lens tube 20 is formed a locking portion 22, and on the outer periphery of the flange 211 is formed a first conical surface 23.

The mounting base 30 is interiorly formed with a receiving space 31, on an outer periphery of a flange 321 of the mounting base 30 are provided a locking portion 32 for mating with the locking portion 22 of the lens tube 20, and in the lower end of the flange 321 of the mounting base 30 is formed a concave portion 331. The concave portion 331 is formed with a second conical surface 33.

The lens array 40 is disposed in the receiving space 21 of the lens tube 20.

The image sensor 50 is disposed in the receiving space 31 of the mounting base 30.

The operation of the embodiment is illustrated in FIG. 2, wherein the lens array 40 is disposed in the lens tube 20, and the locking portion 22 of the lens tube 20 is in the form of inner threads located on the flange of the flange 211. The first conical surface 23 is formed on the outer periphery of the lens tube 20, and the locking portion 32 of the mounting base 30 is in the form of outer threads located on the outer periphery of the flange 321 for mating with the inner threads of the lens tube 20. The second conical surface 33 is formed on the periphery of the concave portion 331 for mating with the first conical surface 23 of the lens tube 20. The first conical surface 23 and the second conical surface 33 are used to make the central axis b of the lens tube 20 and the mounting bracket 30 aligned with the optical axis a of the lens array 40. After the lens tube 20 is mounted on the mounting base 30, the locking portion 22 will be engaged with the locking portion 32, plus the first conical surface 23 will also be meshed with the second conical surface 33. And finally, glue can be applied to the junction of the first conical surface 23 and the second conical surface 33, for strengthening the connection therebetween. The mounting base 30 is high enough to cover the bottom of the lens tube 20. By such arrangements, optical signals can be transmitted to the image sensor 50 precisely, and after long time of use, the optical axis a will not deviate from the optical axis b. In addition, it can alleviate the wobbles of the lens tube 20 and the mounting base 30. The locking portion 22 is located at the outside of the locking portion 32.

Figure 3:
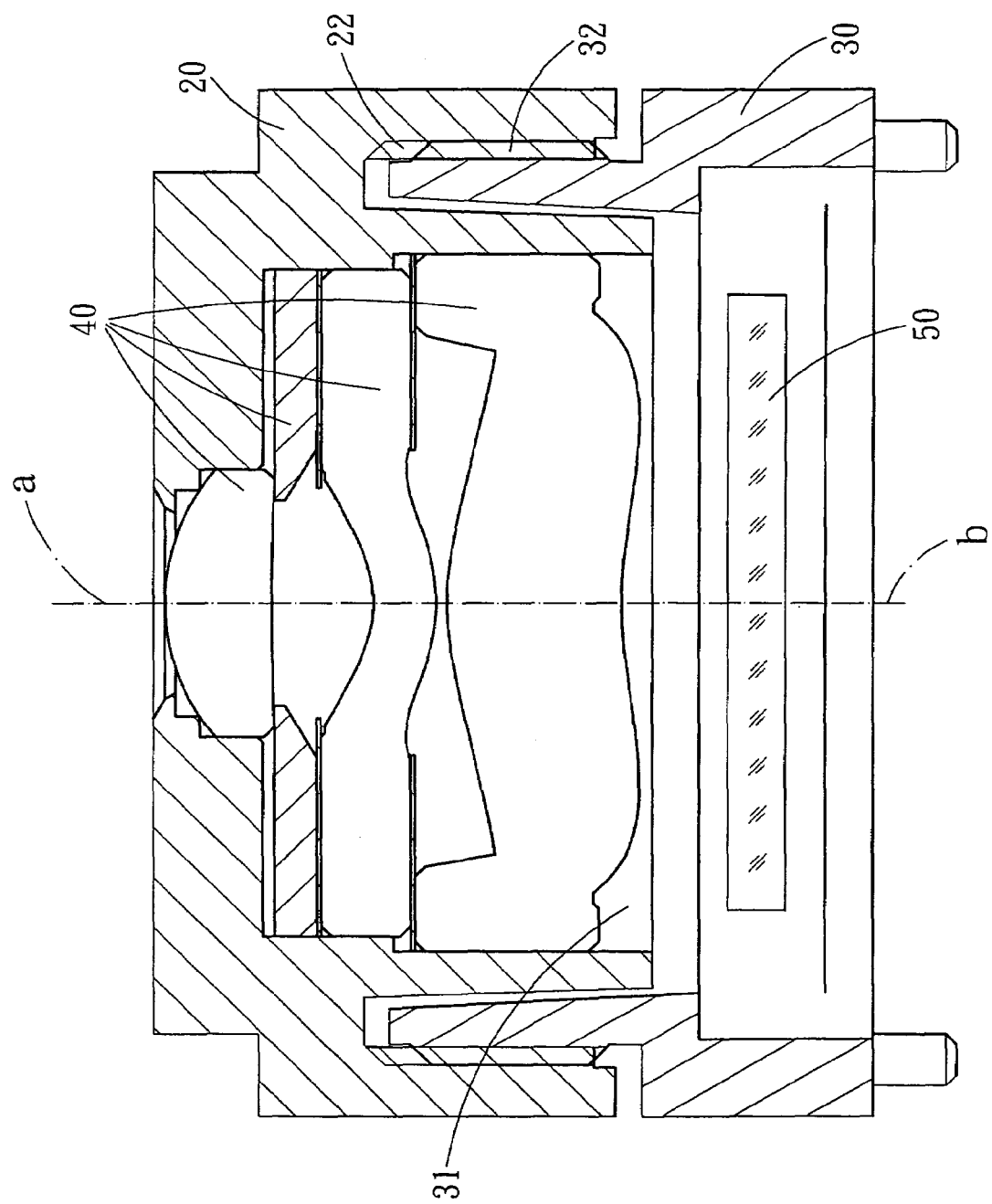
FIG. 3 is an operational view of showing a lens tube and a mounting base thereof in accordance with another embodiment of the present invention.

Referring to FIG. 3, a second embodiment of the present invention is shown, which is similar to the first embodiment, except that:

The locking portion 22 is formed between the inner periphery and the outer periphery of the lens tube 20 for mating with the locking portion 32 of the mounting base 30.

While we have shown and described various embodiments in accordance with the present invention, it should be clear to those skilled in the art that further embodiments may be made without departing from the scope of the present invention.

What is claimed is:

1. A lens tube and a mounting base thereof comprising a lens tube for reception of a lens array and a mounting base for accommodation of an image sensor, the lens tube being formed with a locking portion for mating with a locking portion of the mounting base, the locking portion of the lens tube is located at outside of the locking portion of the mounting base;

wherein the mounting base is formed with a second conical surface for mating with the locking portion of the lens tube, the second conical surface is located at a lower edge of the locking portion of the mounting base, at an end of the locking portion of the lens tube is formed a first conical surface for mating the second conical surface.

2. The lens tube and a mounting base thereof as claimed in claim 1, wherein a concave portion is formed outside of the locking portion of the mounting base, and the second conical surface for mating with the first conical surface of the lens tube is formed in the concave portion.

3. The lens tube and a mounting base thereof as claimed in claim 1, wherein the locking portion of the lens tube is formed on a flange in a receiving space of the lens tube.

4. The lens tube and a mounting base thereof as claimed in claim 1, wherein the locking portion of the mounting base is formed on a flange of the mounting base.

5. The lens tube and a mounting base thereof as claimed in claim 2, wherein the first conical surface is located on an outer periphery of the lens tube.

6. The lens tube and a mounting base thereof as claimed in claim 1, wherein the lens tube and the mounting base are fixed by gluing method.

7. The lens tube and a mounting base thereof as claimed in claim 1, wherein the locking portion of the lens tube is formed between an inner periphery and an outer periphery of the lens tube for mating with the locking portion of the mounting base.

\* \* \* \* \*